(12) United States Patent
Boyle et al.

(10) Patent No.: US 7,206,497 B1
(45) Date of Patent: Apr. 17, 2007

(54) ELECTRONIC PROGRAM GUIDE SUBSYSTEM FOR RECEIVING AND PROCESSING ELECTRONIC PROGRAM GUIDE INFORMATION FROM A SET-TOP BOX

(75) Inventors: William B. Boyle, Lake Forest, CA (US); Tim J. Elliott, Fountain Valley, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 920 days.

(21) Appl. No.: 09/652,730

(22) Filed: Aug. 31, 2000

(51) Int. Cl.
*H04N 5/91* (2006.01)

(52) U.S. Cl. .......................... 386/83; 386/125; 725/39; 725/131

(58) Field of Classification Search .................... 386/1, 386/45–46, 83, 94, 98, 124–126, 35, 40; 725/39, 41, 54, 104, 131, 133, 139, 141, 725/151, 153; 348/569, 553, 906; 710/20, 710/64; 707/104.1
See application file for complete search history.

(56) References Cited

U.S. PATENT DOCUMENTS

| 5,479,266 | A |   | 12/1995 | Young et al. |
|---|---|---|---|---|
| 5,594,509 | A |   | 1/1997 | Florin et al. |
| 5,648,824 | A | * | 7/1997 | Dunn et al. ..................... 386/45 |
| 5,699,107 | A | * | 12/1997 | Lawler et al. ............... 348/906 |
| 5,760,821 | A | * | 6/1998 | Ellis et al. ................... 348/906 |
| 5,808,608 | A |   | 9/1998 | Young et al. |
| 5,828,419 | A |   | 10/1998 | Bruette et al. |
| 5,850,218 | A |   | 12/1998 | LaJoie et al. |

(Continued)

FOREIGN PATENT DOCUMENTS

JP    A-10162448    6/1998

OTHER PUBLICATIONS

PCT Written Opinion, dated Nov. 4, 2002; PCT/US01/27416.

(Continued)

*Primary Examiner*—James J. Groody
*Assistant Examiner*—Christopher Onuaku
(74) *Attorney, Agent, or Firm*—Jason T. Evans, Esq.; Knobbe, Martens, Olson & Bear (57) ABSTRACT

An electronic program guide processing device is connectable to a set-top box configured to receive electronic program guide information. The set-top box includes at least one auxiliary interface that supports communication between the electronic program guide processing device and the set-top box. The electronic program guide processing device includes at least one device interface connectable to the auxiliary interface. The electronic program guide processing device further includes an electronic program guide subsystem connected to the device interface to receive and process the electronic program guide information from the set-top box. In one aspect, a digital video recorder is connectable to a set-top box configured to receive electronic program guide information and broadcast audiovisual data. The set-top box includes at least one auxiliary interface that supports communication between the digital video recorder and the set-top box. The digital video recorder includes at least one recorder interface connectable to the auxiliary interface, and includes a storage device. The digital video recorder further includes an electronic program guide subsystem connected to the recorder interface to receive the electronic program guide information from the set-top box and to process the electronic program guide information to schedule recording the broadcast audiovisual data on the storage device.

29 Claims, 4 Drawing Sheets

U.S. PATENT DOCUMENTS

| | | | |
|---|---|---|---|
| 5,907,323 | A | 5/1999 | Lawler et al. |
| 5,963,264 | A * | 10/1999 | Jackson ................. 386/83 |
| 6,002,394 | A * | 12/1999 | Schein et al. ............. 725/39 |
| 6,003,041 | A * | 12/1999 | Wugofski ............ 707/104.1 |
| 6,016,141 | A * | 1/2000 | Knudson et al. .......... 725/104 |
| 6,137,539 | A * | 10/2000 | Lownes et al. ........... 725/139 |
| 6,289,169 | B1 * | 9/2001 | Okuyama ................. 386/83 |
| 6,292,624 | B1 | 9/2001 | Saib et al. |
| 6,298,400 | B1 * | 10/2001 | Candelore ................ 710/20 |
| 6,430,359 | B1 * | 8/2002 | Yuen et al. ............... 386/83 |
| 6,751,402 | B1 | 6/2004 | Elliott et al. |
| 6,771,886 | B1 * | 8/2004 | Mendelsohn ............. 386/83 |
| 2002/0092021 | A1 | 7/2002 | Yap et al. |
| 2002/0170073 | A1 | 11/2002 | Miller et al. |

OTHER PUBLICATIONS

TiVo User Guides, Personal Video Recorder, "Introduction", http://www.tivo.com, pp. 1-4.

TiVo User Guides, Personal Video Recorder, "The Basics in 5 Short Tours", http://www.tivo.com, pp. 5-16.

TiVo User Guides, Personal Video Recorder, "Connecting the PTV Recorder", http://www.tivo.com, pp. 5-31.

TiVo User Guides, DIRECTV Receiver with Tivo, "The Basics in 5 Short Tours", http://www.tivo.com, pp. 13-28.

TiVo User Guides, DIRECTV Receiver with Tivo, "Live TV", http://www.tivo.com, pp. 29-38.

* cited by examiner

ELECTRONIC PROGRAM GUIDE SUBSYSTEM FOR RECEIVING AND PROCESSING ELECTRONIC PROGRAM GUIDE INFORMATION FROM A SET-TOP BOX

BACKGROUND OF THE INVENTION

1. Field of the Invention

The present invention relates to information storage and display systems, and more particularly, to video display systems that record information relating to video programming.

2. Description of the Related Art

Digital video recording systems provide the capability of concurrently recording incoming broadcast audiovisual data using hard disk drive technology and playing back previously recorded audiovisual data. A digital video recording system receives incoming broadcast audiovisual data from the output interface of a set-top box configured to receive the broadcast audiovisual data from a service provider, such as a cable or satellite television system. The output of the digital video recording system is then transmitted to a display device, such as a television. Such set-top boxes typically have only one input interface that receives the broadcast audiovisual data and one output interface that transmits the broadcast audiovisual data. In response to commands from the user, the digital video recording system transmits to the display device either the incoming broadcast audiovisual data from the set-top box or the previously recorded audiovideo data.

Set-top boxes are configured to receive electronic program guide (EPG) information from the service provider to provide broadcast scheduling information to the user. EPG information typically includes the title and broadcast times for the scheduled broadcast programs on each channel for a span of days, e.g., the next two weeks. In addition, the EPG information may include other information of potential interest to a user, such as the program genre, cast and director, brief synopsis, etc.

Typically, the EPG information is transmitted by the service provider to the set-top box over the same input line as is the broadcast audiovisual data. The EPG information is typically sent in a "carousel" configuration, in which, for example, the broadcast schedules for each day of the next two weeks are transmitted sequentially. Once the full two-week schedule has been transmitted, the cycle begins again, including any updated information, thereby continually providing the set-top box with up-to-date EPG information. The set-top box is configured to recognize the EPG information, extract it from the incoming data, and store a portion of the EPG information to resident random-access memory (RAM). In response to commands from the user, the set-top box displays the EPG information on the television in a format determined by the service provider.

Known digital video recording systems provide broadcast scheduling information to either the user or resident software programs via a modem that is configured to receive EPG information from an external source. For example, the digital video recording system includes an internal modem that is connected to a telephone line in order to make periodic (e.g., daily) phone calls to an affiliated provider to receive updated EPG information, which is then stored on an internal hard disk drive and used to provide broadcast scheduling information at later times. These periodic connections to the affiliated provider may also be used to transmit software updates to the digital video recording system, and are a potential conduit of advertising information from the affiliated provider to be displayed to the user.

In addition to utilizing a different source of EPG information than the service provider, such digital video recording systems are currently configured to utilize their own format for the display of EPG information to the user, which is typically different from the format used by the service provider for displaying EPG information. Also, while the user is viewing the EPG information, the digital video recording system is in control of the information being displayed to the user, thus taking this control from the broadcaster or service provider.

SUMMARY OF THE INVENTION

The present invention may be regarded as a digital video recorder connectable to a set-top box configured to receive electronic program guide information and broadcast audiovisual data. The set-top box includes at least one auxiliary interface that supports communication between the digital video recorder and the set-top box. The digital video recorder comprises a storage device and at least one recorder interface connectable to the auxiliary interface. The digital video recorder further comprises an electronic program guide subsystem connected to the recorder interface to receive the electronic program guide information from the set-top box and to process the electronic program guide information to schedule recording the broadcast audiovisual data on the storage device.

The present invention may also be regarded as an electronic program guide processing device connectable to a set-top box configured to receive electronic program guide information. The set-top box includes at least one auxiliary interface that supports communication between the electronic program guide processing device and the set-top box. The electronic program guide processing device comprises at least one device interface connectable to the auxiliary interface. The electronic program guide processing device further comprises an electronic program guide subsystem connected to the device interface to receive and process the electronic program guide information from the set-top box.

The present invention may also be regarded as a method for communicating electronic program guide information from a set-top box configured to receive the electronic program guide information to a digital video recorder comprising an electronic program guide subsystem. The method comprises connecting at least one recorder interface of the digital video recorder to at least one auxiliary interface of the set-top box, the recorder interface being connected to the electronic program guide subsystem. The method further comprises recognizing the connection of the digital video recorder to the set-top box. The method further comprises communicating the electronic program guide information from the set-top box to the electronic program guide subsystem.

DETAILED DESCRIPTION OF THE PREFERRED EMBODIMENT

Figure 1:
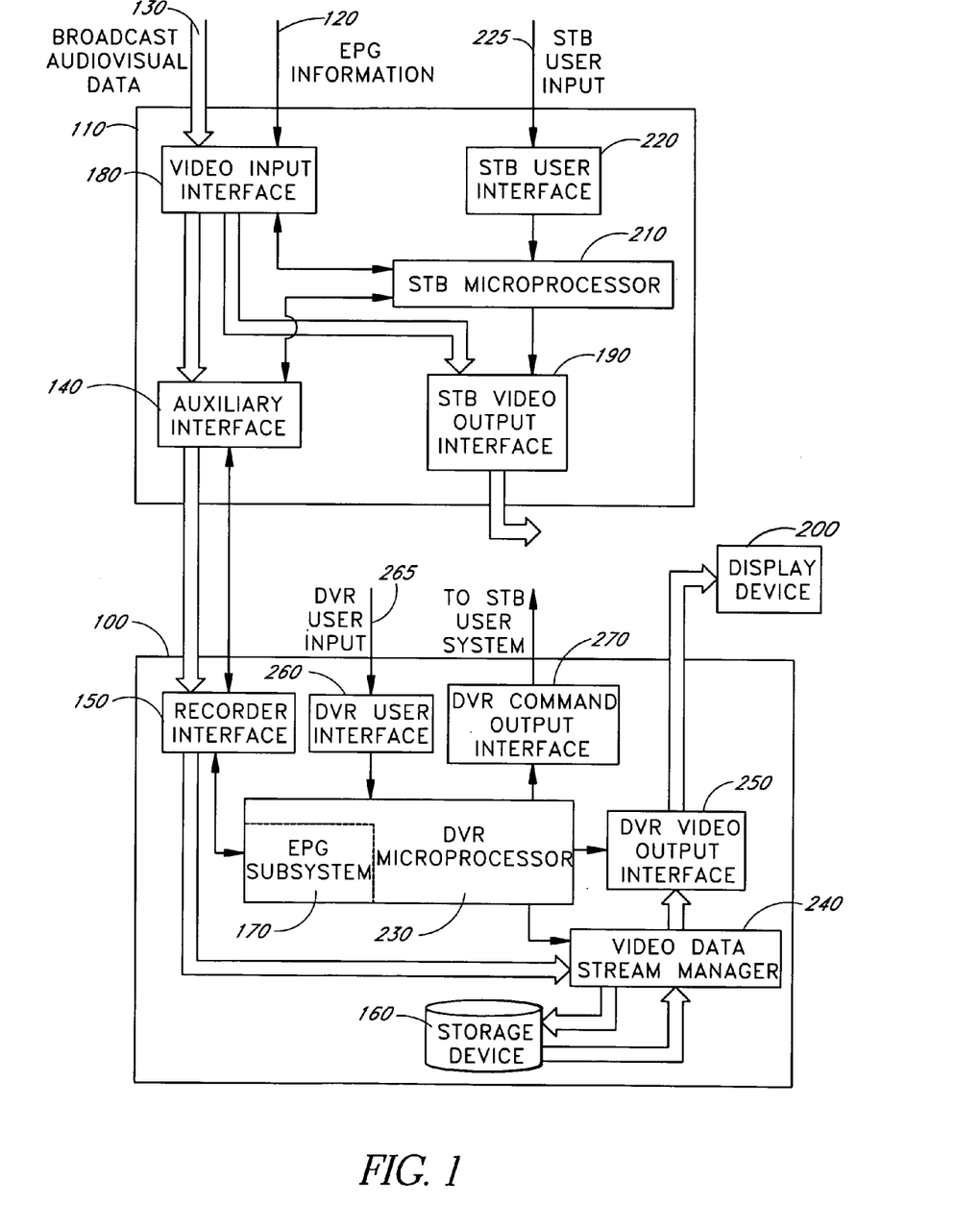
FIG. 1 schematically illustrates a digital video recorder in accordance with an embodiment of the present invention, the digital video recorder connectable to a set-top box configured to receive electronic program guide information and broadcast audiovisual data.

FIG. 1 schematically illustrates a digital video recorder 100 in accordance with an embodiment of the present invention. The digital video recorder 100 is connectable to a set-top box 110 configured to receive electronic program guide (EPG) information 120 and to receive broadcast audiovisual data 130. The set-top box 110 includes at least one auxiliary interface 140 that supports communication between the digital video recorder 100 and the set-top box 110. The digital video recorder 100 comprises a storage device 160 and at least one recorder interface 150 connectable to the auxiliary interface 140. The digital video recorder 100 further comprises an EPG subsystem 170 connected to the recorder interface 150 to receive the EPG information 120 from the set-top box 110 and to process the EPG information 120 to schedule recording the broadcast audiovisual data 130 on the storage device 160. In the preferred embodiment, the EPG subsystem 170 is resident with, and coupled to, a digital video recorder (DVR) microprocessor 230.

The set-top box 110 also includes a video input interface 180, a set-top box (STB) video output interface 190 connectable to a display device 200, a STB microprocessor 210, and a STB user interface 220. The video input interface 180 is configured to receive both the EPG information 120 and the broadcast audiovisual data 130, and is coupled to both the auxiliary interface 140 and the STB video output interface 190. The STB video output interface 190 is configured to provide output video data when connected to the display device 200 (e.g., a television). The STB microprocessor 210 receives EPG information 120 from the video input interface 180 and communicates with the digital video recorder 100 via the auxiliary interface 140. In response to STB user input 225 received via the STB user interface 220, the STB microprocessor 210 transmits signals to the video input interface 180 for channel selection. The STB microprocessor 210 is also coupled to the STB video output interface 190 in order to provide the user with broadcast schedule information in response to the EPG information 120 and STB user input 225 when the STB video output interface 190 is connected to the display device 200.

The digital video recorder 100 further comprises the DVR microprocessor 230, a video data stream manager 240, a DVR video output interface 250, a DVR user interface 260 that receives DVR user input 265, and a DVR command output interface 270. When connected to the auxiliary interface 140 of the set-top box 110, the recorder interface 150 of the digital video recorder 100 receives both the EPG information 120 and the broadcast audiovisual data 130 from the set-top box 110. The recorder interface 150 transmits the EPG information 120 to the EPG subsystem 170 and transmits the broadcast audiovisual data 130 to the video data stream manager 240.

The DVR microprocessor 230 is coupled to the recorder interface 150, the video data stream manager 240, the DVR video output interface 250, the DVR user interface 260, and the DVR command output interface 270. The video data stream manager 240 is coupled to the storage device 160 and the DVR video output interface 250. In response to the DVR user input 265 and the EPG information 120, the DVR microprocessor 230 signals the video data stream manager 240 to control the recording of broadcast audiovisual data 130 from the recorder interface 150 and the playback of previously recorded audiovisual data from the storage device 160. The DVR command output interface 270 is coupled to the STB user interface 220, thereby providing a conduit for commands from the DVR microprocessor 230 to the STB microprocessor 210. Audiovisual data transmitted to the DVR video output interface 250 from the video data stream manager 240 is displayed on the display device 200, which is coupled to the DVR video output interface 250.

In one embodiment of the present invention, the EPG information 120 and the broadcast audiovisual data 130 are transmitted to the set-top box 110 via a single cable from a single source (e.g., a service provider that supply audiovisual programming to multiple users). Examples of service providers include, but are not limited to, cable television systems and satellite systems. The broadcast audiovisual data 130 is typically in the form of signals that are communicated via a plurality of RF carriers that correspond to multiple channels. The audiovisual programming may be communicated as either analog signals or digital signals that modulate the RF carriers. Similarly, the EPG information 120 is communicated as digital signals via at least one RF carrier. In certain embodiments, the EPG information 120 may be a component of one or more channels of the broadcast audiovisual data 130.

The video input interface 180 in the set-top box 110 receives the incoming analog RF signals from the service provider and is configured to extract both the EPG information 120 and the broadcast audiovisual data 130. Examples of video input interfaces 180 which are configured to extract the broadcast audiovisual data 130, whether in digital or analog form, are disclosed in the copending U.S. patent application Ser. No. 09/585,249, which is hereby incorporated by reference. The video input interface 180 compatible with the preferred embodiment is configured to similarly extract the EPG information 120. Alternatively, the extraction of the EPG information 120 and broadcast audiovisual data 130 can be performed by other system components, either upstream or downstream from the video input interface 180. In the preferred embodiment, the video input interface 180 transmits the EPG information 120 and broadcast audiovisual data 130 to the auxiliary interface 140. Persons skilled in the art are able to configure a video input interface 180 compatible with the present invention.

In the preferred embodiment of the present invention, the auxiliary interface 140 and the recorder interface 150 are compatible with the Universal Serial Bus (USB) external bus standard. In other embodiments, the auxiliary interface 140 and recorder interface 150 support isochronous communication compatible with the IEEE 1394 standard, which is described in the "IEEE Std 1394-1995 IEEE Standard for a High Performance Serial Bus," Aug. 30, 1996, which is hereby incorporated by reference. In other embodiments, the auxiliary interface 140 and the recorder interface 150 are compatible with other external bus standards which include asynchronous or synchronous communication capabilities to communicate various commands and information between the digital video recorder 100 and the set-top box 110. The auxiliary interface 140 and the recorder interface 150 of the preferred embodiment are serial interfaces. In other embodiments, the auxiliary interface 140 and the recorder interface 150 are parallel interfaces. Besides providing a conduit for broadcast audiovisual data 130, the auxiliary interface 140 and the recorder interface 150 provide a conduit for EPG information and communication signals between the set-top box 110 and the digital video recorder 100.

The recorder interface 150 transmits the broadcast audiovisual data 130 to the video data stream manager 240, and transmits the EPG information 120 to the EPG subsystem 170. In response to signals from the DVR microprocessor 230, the video data stream manager 240 transmits the broadcast audiovisual data 130 to be recorded to the storage device 160 and transmits the audiovisual data to be displayed to the display device 200 via the DVR video output interface 250, thereby controlling the recording and playback of audiovisual data in response to signals from the DVR microprocessor 230. An example of a video data stream manager 240 which transmits and receives audiovisual data using the storage device 160 is disclosed by the copending U.S. patent application Ser. No. 09/585,249, which has been incorporated by reference hereabove. The video data stream manager 240 compatible with the preferred embodiment illustrated in FIG. 1 is also configured to transmit audiovisual data to be displayed to the DVR video output interface 250. Persons skilled in the art are able to configure a video data stream manager 240 compatible with the present invention.

The DVR video output interface 250 receives the audiovisual data from the video data stream manager 240 and receives EPG information 120 from the DVR microprocessor 230. The DVR video output interface 250 generates an appropriate display signal, which is transmitted to the display device 160. Examples of video output interfaces which can serve as a DVR video output interface 250 compatible with the present invention are disclosed by the copending U.S. patent application Ser. No. 09/585,249, which has been incorporated by reference hereabove. Persons skilled in the art are able to configure a DVR video output interface 250 compatible with the present invention.

The storage device 160 of the preferred embodiment illustrated in FIG. 1 is a rotating storage drive (e.g., a hard disk drive). Alternatively, the storage device 160 can be a writable digital video disk (DVD) drive, or a device that utilizes another technology that provides writable non-volatile storage.

The DVR microprocessor 230 of the preferred embodiment utilizes the results from a preference determination engine, as well as DVR user input 265, to control the operation of both the digital video recorder 100 and the set-top box 110. The preference determination engine is an algorithm, enabled in hardware, software, or both, which monitors a user's viewing patterns to create a user profile of the user's watching preferences. In the preferred embodiment, the preference determination engine is resident in the DVR microprocessor 230. Based on the user profile and the EPG information 120 for the upcoming program schedule, the preference determination engine recommends particular television programs which the user may be interested in watching. These recommendations assist users to schedule their recording schedules by alerting them to upcoming programs of interest. In certain embodiments, the digital video recorder 100 can be configured to automatically record these programs without further input from the user. An example of a preference determination engine is MbTV™ sold by Metabyte Networks, Inc. of Fremont, Calif.

The DVR microprocessor 230 accesses the EPG information 120 from the EPG subsystem 170. The DVR microprocessor 230 also communicates user requests and other commands to the video data stream manager 240, and provides information, including EPG information 120, to the DVR video output interface 250 to be displayed to the user.

In addition, the DVR microprocessor 230 communicates with the STB microprocessor 210. In the preferred embodiment, this communication includes signals transmitted across the recorder interface 150 and the auxiliary interface 140. Another conduit of communication is the DVR command output interface 270, which is coupled to the STB user interface 220. One example of such a DVR output command interface 270 is an "IR Blaster" which, in response to the DVR microprocessor 230, generates infrared signals which are transmitted to an infrared STB user interface 220. In this way, the STB microprocessor 210 is effectively slaved to the DVR microprocessor 230.

Figure 2:
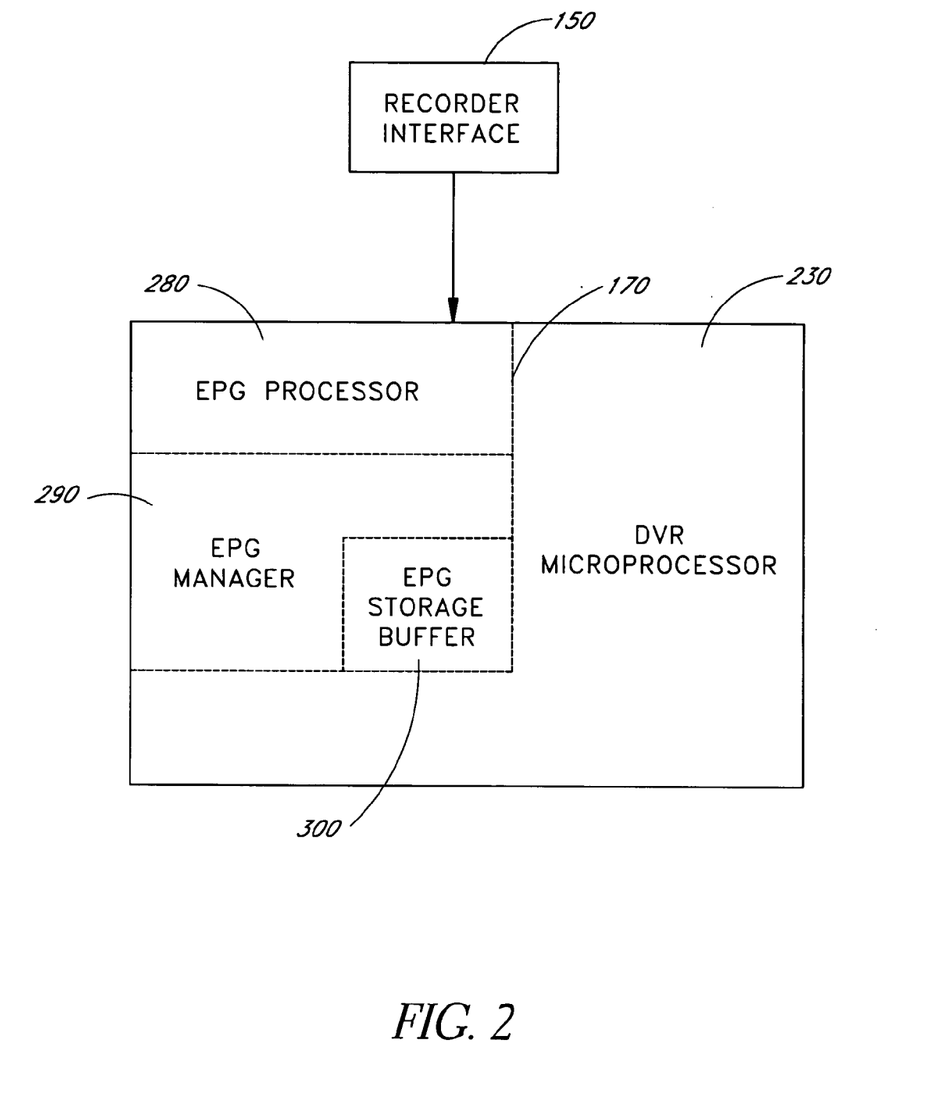
FIG. 2 schematically illustrates an electronic program guide subsystem compatible with the preferred embodiment of the present invention.

FIG. 2 schematically illustrates an EPG subsystem 170 compatible with the preferred embodiment of the present invention. The EPG subsystem 170 comprises an EPG processor 280, an EPG manager 290, and an EPG storage buffer 300. The EPG processor 280 communicates with the STB microprocessor 210 via a communications protocol which utilizes messages transmitted across the recorder interface 150 and the auxiliary interface 140 to transfer EPG information 120 from the set-top box 110 to the digital video recorder 100. In certain embodiments, the EPG processor 280 can decode encoded EPG information 120, enact compression/decompression utilities to optimize the storage and transfer of EPG information 120, or perform other process operations on the EPG information 120 from the set-top box 110. In such embodiments, the user is presented with processed EPG information.

The EPG manager 290 compiles the EPG information 120 received from the set-top box 110 into a database, which is stored in the EPG storage buffer 300. The EPG manager 290 accesses the EPG information 120 stored in the EPG storage buffer 300 in response to commands from the DVR microprocessor 230, and makes requested EPG information 120 available to the DVR microprocessor 230. The DVR microprocessor 230 utilizes the EPG information 120 to provide the user with broadcast scheduling information and to provide the preference determination engine with the EPG information 120 required to compile a user profile of the user's watching preferences and to enable automatic recording of programs of interest. In this way, the EPG manager 290 processes the EPG information 120 to schedule recording the broadcast audiovisual data 130 on the storage device 160. In the preferred embodiment, the EPG storage buffer 300 is stored on the storage drive 160. Alternatively, in other embodiments, the EPG storage buffer 300 is stored in whole or in part in random-access memory resident with the DVR microprocessor 230.

By accessing the EPG information 120 that is transmitted to set-top boxes 110 by service providers, the digital video recorder 100 of the preferred embodiment does not require a modem to receive EPG information 120 from a third-party source. Therefore, the digital video recorder 100 avoids the complexity and costs associated with prior art digital video recording systems. Furthermore, the service provider remains in control of the information displayed to the user because the digital video recorder 100 utilizes the EPG information 120 received from the service provider, as opposed to a third-party source. By maintaining control by the service provider, the format of the broadcast scheduling information can then be similar to the format presented by the set-top box 110 in video systems without a digital video recorder 100. The similarity between formats provides a more seamless transition for the user upon adding a digital video recorder 100 to the user's video system. This retention of control by the service provider can be particularly important economically in embodiments in which advertising information is transmitted to the digital video recorder 100 along with the EPG information 120 (i.e., where control of what the user is viewing can be translated into advertising revenue and opportunities for pay-per-view sales).

In the preferred embodiment, the STB microprocessor 210 continually monitors the EPG information 120 received by the video input interface 180, and stores a portion of the EPG information 120 in RAM resident with the STB microprocessor 210. When the STB microprocessor 210 detects that new or updated EPG information 120 has been received, the STB microprocessor 210 stores the new or updated EPG information 120 in resident RAM, and sends a "New EPG data available" message to the EPG processor 280, which responds by returning an "Acknowledge response" message. After the EPG processor 280 has been informed that there is new or updated EPG information 120 available, the EPG processor 280 can request that the new or updated EPG information 120 be sent by the STB microprocessor 210 to the EPG processor 280 by sending an "EPG data request" message to the STB microprocessor 210. The STB microprocessor 210 responds by sending an "EPG data response" message which contains the requested new or updated EPG information 120. In this way, the digital video recorder 100 is continually provided with up-to-date EPG information as soon as such information is transmitted to the set-top box 110 by the service provider. This continuous and timely updating of the EPG information 120 used by the digital video recorder 100 is in contrast to prior art digital recording systems which only provide periodic updates (e.g., daily) of EPG information. Other communication protocols between the EPG processor 280 and the STB microprocessor 210 are compatible with the present invention. Persons skilled in the art are able to select an appropriate communications protocol to practice the present invention.

Figure 3:
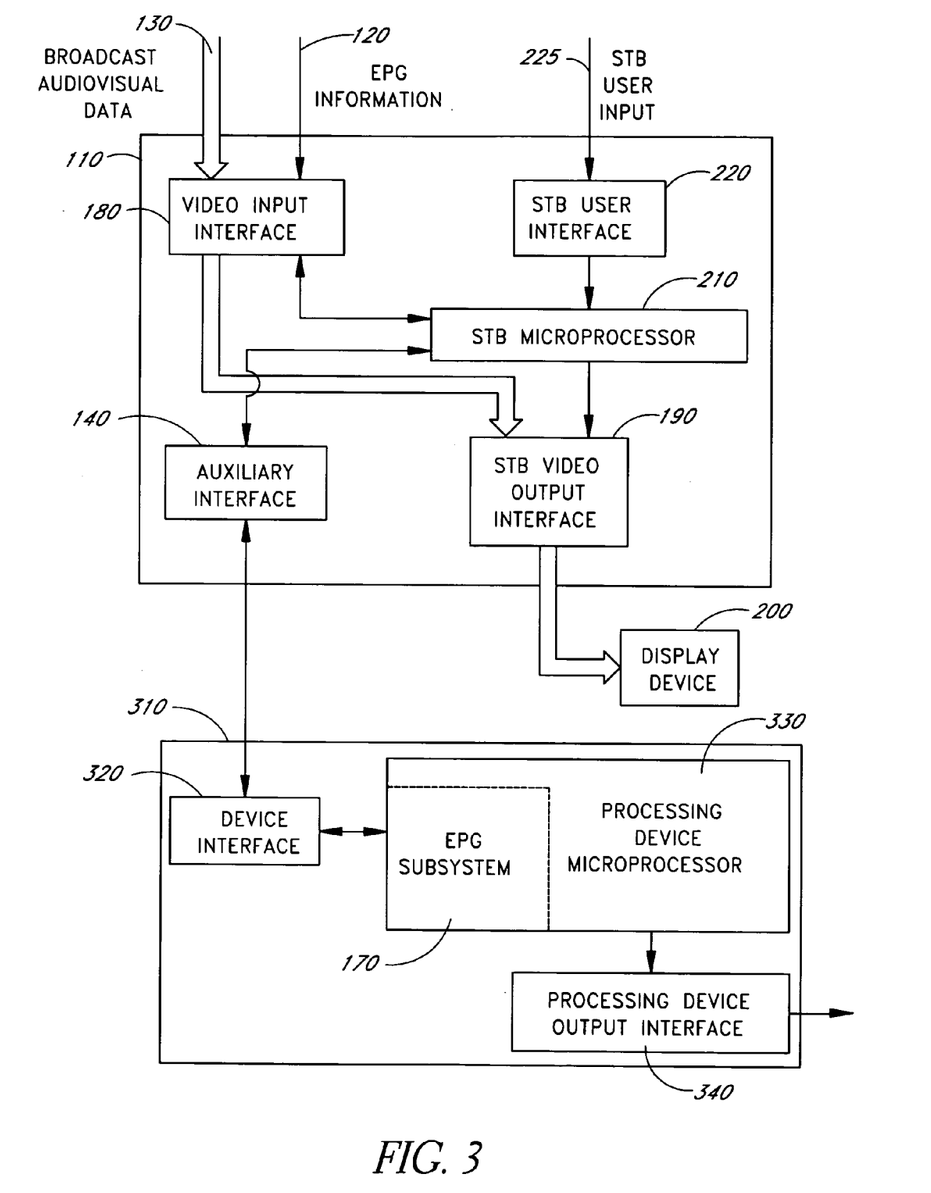
FIG. 3 schematically illustrates an electronic program guide processing device in accordance with an embodiment of the present invention.

In other embodiments compatible with the present invention, an electronic program guide (EPG) processing device 310 is used in conjunction with a set-top box 110, as schematically illustrated in FIG. 3. The EPG processing device 310 is connectable to a set-top box 110 configured to receive EPG information 120. The set-top box 110 includes at least one auxiliary interface 140 that supports communication between the EPG processing device 310 and the set-top box 110. The EPG processing device 310 comprises at least one device interface 320 connectable to the auxiliary interface 140. The EPG processing device 310 further comprises an EPG subsystem 170 connected to the device interface 320 to receive and process the EPG information 120 from the set-top box 110. In the embodiment illustrated in FIG. 3, the EPG subsystem 170 is resident with, and coupled to, a user viewing monitor 330.

In certain embodiments in which the EPG processing device 310 has access to a storage device, the EPG processing device 310 can comprise a digital video recorder similar to the embodiment schematically illustrated in FIG. 1. In alternative embodiments without a storage drive, the EPG processing device 310 can be used to monitor the viewing history and preferences of the user.

The EPG processing device 310 in FIG. 3 accesses the EPG information 120 from the set-top box 110 in a substantially similar manner as the digital video recorder 100 described above. The EPG processing device 310 further comprises the user viewing monitor 330 coupled to a processing device output interface 340. The user viewing monitor 330 communicates with the STB microprocessor 210 via the device interface 320 and the auxiliary interface 140 to request EPG information 120 to be transmitted to the EPG subsystem 170 from the set-top box 110. The user viewing monitor 330 also utilizes the EPG information 120 from the EPG subsystem 170 to monitor the viewing history and preferences of the user, thereby compiling user information. In the embodiment schematically illustrated in FIG. 3, the user viewing monitor 330 comprises a processing device microprocessor 330. The output from the processing device microprocessor 330 is transmitted to the processing device output interface 340 which is coupled to a repository of such user information. In certain embodiments, the user information is transmitted to the service provider across the same cable which provides the EPG information 120 and the broadcast audiovisual data 130. Alternatively, the user information is transmitted across a separate cable.

Figure 4:
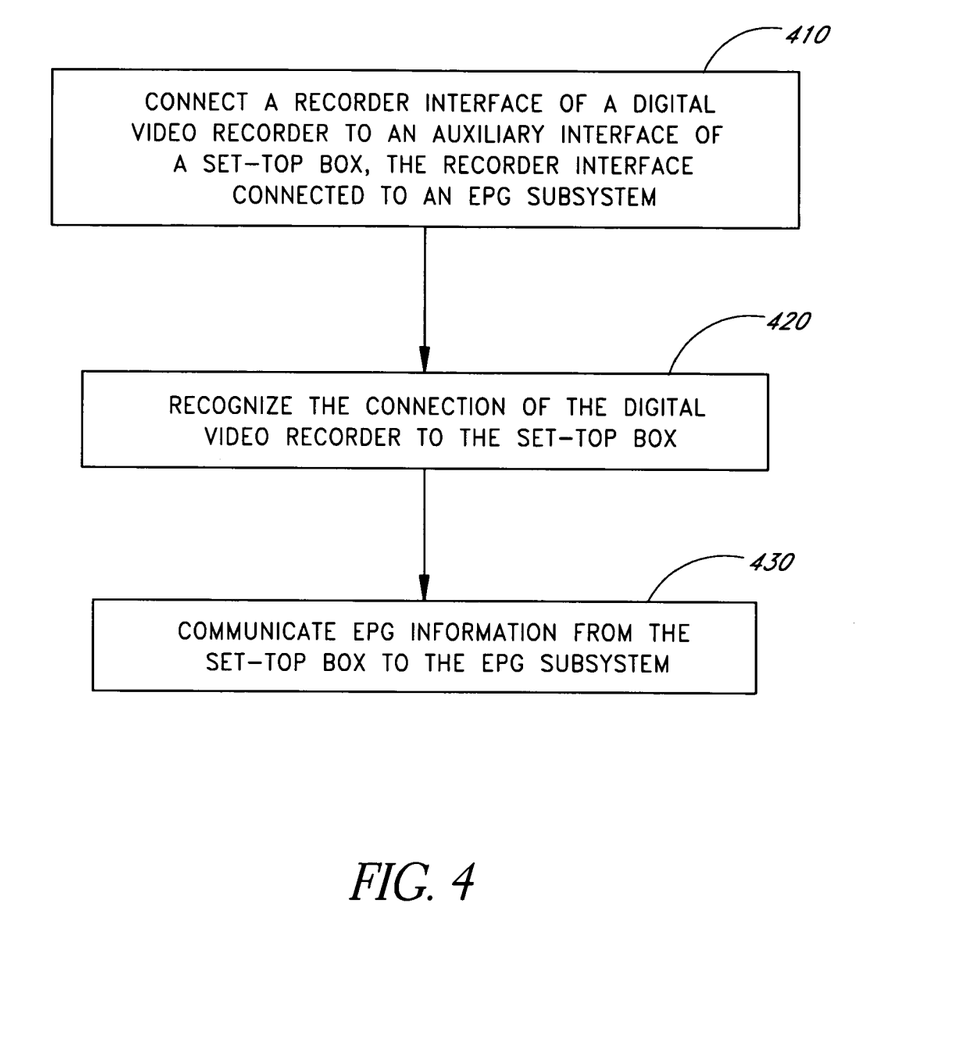
FIG. 4 is a flow diagram in accordance with an embodiment of the present invention, in which electronic program guide information is communicated from a set-top box configured to receive electronic program guide information to a digital video recorder comprising an electronic program guide subsystem.

FIG. 4 is a flow diagram in accordance with an embodiment of the present invention, in which EPG information 120 is communicated from a set-top box 110 configured to receive EPG information 120 to a digital video recorder 100 comprising an EPG subsystem 170. In certain embodiments, the EPG subsystem 170 includes a EPG storage buffer in which the EPG information 120 is stored. As described above, the EPG information 120 can be transmitted from the same source as the broadcast audiovisual data 130, and can be received by the input interface 180 of the set-top box 110. In certain embodiments, the EPG information 120 is included in the broadcast audiovisual data 130. The flow diagram is described with reference to the digital video recorder 100 and set-top box 110 illustrated in FIG. 1. Persons skilled in the art are able to recognize that, while the flow diagram illustrates a particular embodiment with steps in a particular order, other embodiments with different orders of steps are also compatible with the present invention.

In a step 410, the recorder interface 150 of the digital video recorder 100 is connected to the auxiliary interface 140 of the set-top box 110, the recorder interface 150 being connected to the EPG subsystem 170. This connection of the recorder interface 150 to the auxiliary interface 140 provides a conduit for communication between the STB microprocessor 210 and the DVR microprocessor 230, broadcast audiovisual data 130, and EPG information 120.

In a step 420, the connection of the digital video recorder 100 to the set-top box 110 is recognized by the STB microprocessor 210 through communication between the STB microprocessor 210 and the DVR microprocessor 230. In the preferred embodiment of the present invention, this communication is in the form of messages sent from the DVR microprocessor 230 to the STB microprocessor 210.

In a step 430, the EPG information 120 is communicated from the set-top box 110 to the EPG subsystem 170. In certain embodiments, the EPG subsystem receives updated EPG information 120 from the set-top box 110, where the set-top box 110 is configured to detect updated EPG information 120. As described above, in certain embodiments the EPG subsystem 170 receives EPG information 120 that is selectively transmitted by the set-top box 110 via the auxiliary interface 140 and the recorder interface 150. Additionally, in certain embodiments, this selective transmitting of the EPG information 120 by the set-top box 110 is in response to a request signal transmitted by the EPG subsystem 170, or in response to user input.

What is claimed is:

1. A digital video recorder connectable to a set-top box configured to receive electronic program guide information and broadcast audiovisual data, the set-top box including at least one auxiliary interface that supports communication between the digital video recorder and the set-top box, the digital video recorder comprising:
   at least one recorder interface connectable to the auxiliary interface;
   a storage device;
   a microprocessor configured to control the digital video recorder and the set-top box, the microprocessor comprising an electronic program guide subsystem connected to the recorder interface to receive the electronic program guide information from the set-top box and to process the electronic program guide information to schedule recording the broadcast audiovisual data on the storage device; and
   a video output interface separate from the recorder interface, the video output interface connectable to a display device.

2. The digital video recorder of claim 1, wherein the electronic program guide subsystem comprises an electronic program guide processor.

3. The digital video recorder of claim 2, wherein the electronic program guide subsystem further comprises an electronic program guide manager.

4. The digital video recorder of claim 1, wherein the electronic program guide subsystem further comprises an electronic program guide storage buffer to store the electronic program guide information.

5. The digital video recorder of claim 1, wherein the electronic program guide subsystem is configured to present processed electronic program guide information to a user.

6. The digital video recorder of claim 1, wherein the digital video recorder receives the electronic program guide information and the broadcast audiovisual data from a single source.

7. The digital video recorder of claim 6, wherein the single source is the set-top box.

8. The digital video recorder of claim 6, wherein the digital video recorder receives the electronic program guide information and the broadcast audiovisual data via a single interface.

9. The digital video recorder of claim 6, wherein the digital video recorder receives the electronic program guide information as a component of one or more channels of the broadcast audiovisual data.

10. The digital video recorder of claim 1, wherein the electronic program guide subsystem is configured to receive updated electronic program guide information from the set-top box, where the set-top box is configured to detect updated electronic program guide information.

11. The digital video recorder of claim 1, wherein the electronic program guide subsystem is configured to receive electronic program guide information selectively transmitted by the set-top box via the auxiliary interface and the recorder interface.

12. The digital video recorder of claim 11, wherein the electronic program guide subsystem is configured to transmit a request signal to the set-top box, where the set-top box is configured to selectively transmit the electronic program guide information to the electronic program guide subsystem in response to the request signal.

13. The digital video recorder of claim 1, wherein the at least one auxiliary interface supports isochronous communication.

14. The digital video recorder of claim 1, wherein the at least one auxiliary interface supports asynchronous communication.

15. The digital video recorder of claim 1, wherein the at least one auxiliary interface supports synchronous communication.

16. The digital video recorder of claim 1, wherein the at least one recorder interface supports isochronous communication.

17. The digital video recorder of claim 1, wherein the at least one recorder interface supports asynchronous communication.

18. The digital video recorder of claim 1, wherein the at least one recorder interface supports synchronous communication.

19. A digital video recorder connectable to a set-top box configured to receive electronic program guide information, the set-top box including at least one auxiliary interface that supports communication between the digital video recorder and the set-top box, the digital video recorder comprising:
   at least one device interface connectable to the auxiliary interface;
   a microprocessor configured to control the digital video recorder and the set-top box, the microprocessor comprising an electronic program guide subsystem connected to the device interface to receive and process the electronic program guide information from the set-top box; and
   a video output interface separate from the device interface, the video output interface connectable to a display device.

20. The digital video recorder of claim 19, wherein the digital video recorder comprises a user viewing monitor that keeps track of and compiles a user viewing history and set of user preferences.

21. A method for communicating electronic program guide information from a set-top box configured to receive the electronic program guide information to a digital video recorder comprising a video output interface connectable to a display device and a microprocessor configured to control the digital video recorder and the set-top box, the microprocessor comprising an electronic program guide subsystem, the method comprising:
   connecting at least one recorder interface of the digital video recorder to at least one auxiliary interface of the set-top box, the recorder interface separate from the video output interface and connected to the electronic program guide subsystem;
   recognizing the connection of the digital video recorder to the set-top box; and
   communicating the electronic program guide information from the set-top box to the electronic program guide subsystem.

22. The method of claim 21, wherein the electronic program guide information and broadcast audiovisual data are transmitted to the set-top box from a single source.

23. The method of claim 22, wherein the electronic program guide information and the broadcast audiovisual data are received by an input interface of the set-top box.

24. The method of claim 22, wherein the electronic program guide information is included in the broadcast audiovisual data.

25. The method of claim 21, wherein the electronic program guide subsystem receives updated electronic program guide information from the set-top box, where the set-top box is configured to detect updated electronic program guide information.

26. The method of claim 21, wherein the electronic program guide subsystem receives electronic program guide information selectively transmitted by the set-top box via the auxiliary interface and the recorder interface.

27. The method of claim 26, wherein the electronic program guide subsystem transmit a request signal to the set-top box, and the set-top box selectively transmits the electronic program guide information to the electronic program guide subsystem in response to the request signal.

28. The method of claim 26, wherein the transmitting of the electronic program guide information from the set-top box is performed selectively in response to user input.

29. The method of claim 21, wherein the method further comprises storing the electronic program guide information in an electronic program guide storage buffer of the electronic program guide subsystem.

* * * * *